(12) United States Patent
Xu et al.

(10) Patent No.: US 12,284,081 B2
(45) Date of Patent: *Apr. 22, 2025

(54) NETWORK SERVICE MANAGEMENT METHOD, DEVICE, AND SYSTEM

(71) Applicant: Huawei Technologies Co., Ltd., Shenzhen (CN)

(72) Inventors: Ruiyue Xu, Shanghai (CN); Kai Zhang, Shanghai (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,458

(22) Filed: Oct. 31, 2023

(65) Prior Publication Data
US 2024/0064062 A1 Feb. 22, 2024

Related U.S. Application Data

(63) Continuation of application No. 16/875,496, filed on May 15, 2020, now Pat. No. 11,831,509, which is a
(Continued)

(30) Foreign Application Priority Data

Nov. 16, 2017 (CN) .......................... 201711140055.2

(51) Int. Cl.
*G06F 15/177* (2006.01)
*H04L 41/08* (2022.01)
(Continued)

(52) U.S. Cl.
CPC ...... *H04L 41/0893* (2013.01); *H04L 41/0813* (2013.01); *H04L 41/0886* (2013.01);
(Continued)

(58) Field of Classification Search
USPC ........................................................ 709/220
See application file for complete search history.

(56) References Cited

U.S. PATENT DOCUMENTS

2007/0218880 A1* 9/2007 Felter .................... H04W 16/18
455/414.1
2016/0353367 A1 12/2016 Vrzic et al.
(Continued)

FOREIGN PATENT DOCUMENTS

CN 104518935 A 4/2015
CN 106550410 A 3/2017
(Continued)

OTHER PUBLICATIONS

3GPP TS 22.261 V15.2.0 Sep. 2017, 3rd Generation Partnership Project; Technical Specification Group Services and System Aspects; Service requirements for the 5G system; Stage 1(Release 15), 51 pages.
(Continued)

*Primary Examiner* — Atta Khan
(74) *Attorney, Agent, or Firm* — Conley Rose, P.C.

(57) ABSTRACT

A network service management method in which a network management unit obtains information about a target network service, where the information about the target network service includes an identifier of the target network service and requirement information of the target network service. The network management unit obtains an identifier of a network based on the requirement information of the target network service, where the network meets the requirement information of the target network service. The network management unit configures an association relationship between the identifier of the target network service and the identifier of the network, or the network management unit configures the identifier of the target network service in management information of the network, or the network
(Continued)

management unit configures the identifier of the network in management information of the network service.

21 Claims, 7 Drawing Sheets

Related U.S. Application Data continuation of application No. PCT/CN2018/115091, filed on Nov. 12, 2018.

(51) Int. Cl.
| | |
|---|---|
| H04L 41/0813 | (2022.01) |
| H04L 41/0893 | (2022.01) |
| H04L 41/5054 | (2022.01) |
| H04L 47/78 | (2022.01) |
| H04L 67/148 | (2022.01) |
| H04L 67/51 | (2022.01) |

(52) U.S. Cl.
CPC ........ *H04L 41/5054* (2013.01); *H04L 47/781* (2013.01); *H04L 67/148* (2013.01); *H04L 67/51* (2022.05)

(56) References Cited

U.S. PATENT DOCUMENTS

| | | | |
|---|---|---|---|
| 2017/0086118 A1* | 3/2017 | Vrzic | .................... H04W 36/26 |
| 2017/0141973 A1* | 5/2017 | Vrzic | .................... H04W 76/11 |
| 2018/0192445 A1 | 7/2018 | Jiang | |
| 2018/0206152 A1 | 7/2018 | Zhang et al. | |
| 2019/0037409 A1* | 1/2019 | Wang | ...................... H04W 8/08 |
| 2019/0230584 A1 | 7/2019 | Lou et al. | |
| 2020/0187182 A1 | 6/2020 | Shimojou et al. | |
| 2020/0280493 A1 | 9/2020 | Xu et al. | |

FOREIGN PATENT DOCUMENTS

| | | |
|---|---|---|
| CN | 106572516 A | 4/2017 |
| CN | 106572517 A | 4/2017 |
| CN | 106657194 A | 5/2017 |
| CN | 106851589 A | 6/2017 |
| CN | 106982458 A | 7/2017 |
| CN | 107295609 A | 10/2017 |
| CN | 107343306 A | 11/2017 |
| CN | 109803281 B | 11/2021 |
| WO | 2016192636 A1 | 12/2016 |
| WO | 2017143047 A1 | 8/2017 |
| WO | 2017154728 A1 | 9/2017 |

OTHER PUBLICATIONS

3GPP TR 21.905 V14.1.1 Jun. 2017, 3rd Generation Partnership Project; Technical Specification Group Services and System Aspects; Vocabulary for 3GPP Specifications (Release 14), 66 pages.

3GPP TS 32.300 V14.0.0 Mar. 2017, 3rd Generation Partnership Project; Technical Specification Group Services and System Aspects; Telecommunication management; Configuration Management (CM); Name convention for managed objects (Release 14), 27 pages.

Huawei, "Adding Use Case and Requirement for changing the location of network functions within a network slice instance," 3GPP TSG SA WG5 (Telecom Management) Meeting #111 Bis S5A-170143, Feb. 13-17, 2017, Munich (Germany), 3 pages.

3GPP TS 28.531 V0.1.0 (Oct. 2017), "3rd Generation Partnership Project; Technical Specification Group Services and System Aspects; Telecommunication Management; Provisioning of network slicing for 5G networks and services (Release 15)," 11 pages.

3GPP TS 28.622 V14.1.0 (Jun. 2017), "3rd Generation Partnership Project; Technical Specification Group Services and System Aspects; Telecommunication management; Generic Network Resource Model (NRM) Integration Reference Point (IRP); Information Service (IS) (Release 14)," 23 pages.

Huawei (Email Discussion Convenor): "Email discussion on KI#1(Support of network slicing) WT#3 (Network slicing architecture)", 3GPP Draft; S2-163601, Jul. 17, 2016, XP051121432, 6 pages.

* cited by examiner

NETWORK SERVICE MANAGEMENT METHOD, DEVICE, AND SYSTEM

CROSS-REFERENCE TO RELATED APPLICATIONS

This is a continuation of U.S. patent application Ser. No. 16/875,496 filed on May 15, 2020, which is a continuation of International Patent Application No. PCT/CN2018/115091 filed on Nov. 12, 2018, which claims priority to Chinese Patent Application No. 201711140055.2 filed on Nov. 16, 2017. All of the aforementioned patent applications are hereby incorporated by reference in their entireties.

TECHNICAL FIELD

Embodiments of this application relate to the field of communications technologies, and in particular, to a network service management method, device, and system.

BACKGROUND

A most advanced mobile communications technology is used in a 5th generation (5G) mobile communications system. The 5G system can provide a super-capacity bandwidth rate and more secure communication for a mobile user, to meet widely varied service requirements in all walks of life. In the 5G system, a physical network is sliced into a plurality of virtual end-to-end networks using a network slice technology. Each virtual network may be referred to as one network slice (NS). Each network slice is logically independent. Each network slice includes an independent network function or an independent network function instance combination. A same network slice may carry services of different tenants, to meet service requirements and services of the different tenants. For example, an electricity meter reading service and a water meter reading service may be carried in one network slice that supports a meter reading service.

Currently, a service management unit usually aggregates service requests of different tenants into network slice requirement information, and sends the network slice requirement information to a network management unit, such that the network management unit deploys, based on the network slice requirement information, a network slice that carries services of the different tenants. The network management unit is aware of a service obtained through aggregation by the service management unit, but cannot be aware of a plurality of services. Therefore, the network management unit cannot dynamically and adaptively adjust a network resource based on different service requirements.

SUMMARY

Embodiments of this application provide a network service management method, a device, and a system, to resolve an existing problem that a network resource cannot be adaptively and dynamically adjusted based on different service requirements.

To achieve the foregoing objective, the embodiments of this application use the following technical solutions.

According to a first aspect, an embodiment of this application provides a network service management method, including: obtaining, by a network management unit, information about a target network service, where the information about the target network service includes an identifier of the target network service and requirement information of the target network service; obtaining, by the network management unit, an identifier of a network based on the requirement information of the target network service, where the network meets the requirement information of the target network service; and configuring, by the network management unit, an association relationship between the identifier of the target network service and the identifier of the network; or configuring, by the network management unit, the identifier of the target network service in management information of the network; or configuring, by the network management unit, the identifier of the network in management information of the target network service.

The information about the target network service may be information about a target network, the requirement information of the target network service may be requirement information of the target network, and the network may be a network slice, a network slice subnet, or a subnet. This is not limited. The network management unit may configure an association relationship between the identifier of the target network service and the identifier of the network by maintaining the association relationship between the identifier of the target network service and the identifier of the network.

Based on the foregoing implementation, the network management unit may associate the target network service with the network. Because the target network service is a service carried in the network, different services carried in the network can be well distinguished in a scenario in which the network carries a plurality of services, thereby implementing dynamic management by the network management unit on the different services carried in the network.

With reference to the first aspect, in a possible implementation, obtaining, by the network management unit, information about a target network service includes: receiving, by the network management unit, a network management request; and obtaining the information about the target network service from the network management request, where the network management request carries the information about the target network service. Additionally, the network management request includes any one of the following requests: a network creation request, a network allocation request, a network modification request, a network service migration request, or a network activation request.

It should be noted that when the network management request is the network service migration request, and the network service migration request is used to request to migrate the target network service from a source network to a destination network, the network management request further carries an identifier of the source network and an identifier of the destination network.

With reference to the first aspect or the possible implementation of the first aspect, in another possible implementation, obtaining, by the network management unit, an identifier of a network based on the requirement information of the target network service includes: when an existing network meets a requirement of the target network service, obtaining, by the network management unit, an identifier of the existing network that meets the requirement of the target network service; or creating, by the network management unit based on the requirement information of the target network service, a network that meets the requirement information of the target network service, and allocating an identifier to the network.

In this way, the network management unit can use the existing available network or create the new network as the network in this solution, and allocate the identifier to the network.

With reference to any one of the first aspect or the possible implementations of the first aspect, in another possible implementation, the method further includes configuring, by the network management unit, the requirement information of the target network service in the management information of the network.

In this way, the network management unit can configure the requirement information of the target network service in the management information of the network, to specify a specific requirement of the service carried in the network.

With reference to any one of the first aspect or the possible implementations, in another possible implementation, the identifier of the target network service is used to identify a network requirement of a service, and the identifier of the target network service includes but is not limited to any one of the following: a network request identifier, a tenant identifier, a service identifier, a tenant service identifier, a network service requirement information identifier, a network requirement information identifier, network slice selection assistance information, or a network service management information identifier. The network service requirement information identifier may be alternatively a network requirement information identifier.

With reference to any one of the first aspect or the possible implementations, in another possible implementation, the method further includes: determining, by the network management unit, requirement information of at least one network slice subnet service based on the requirement information of the target network service; and allocating, by the network management unit to each of the at least one network slice subnet service, an identifier of the network slice subnet service.

In this way, the requirement information of the target network service can be split into the requirement information of the at least one network slice subnet service, to carry the target network service in a plurality of network slice subnets.

With reference to the foregoing possible implementation, in another possible implementation, the method further includes configuring, by the network management unit, an association relationship between the identifier of the network slice subnet service and the identifier of the target network service.

In this way, the network management unit can associate a network slice service with the network slice subnet service, to specify a specific network slice subnet service included in the network slice service.

According to an aspect, an embodiment of this application provides a network management unit, including an obtaining module configured to: obtain information about a target network service, where the information about the target network service includes an identifier of the target network service and requirement information of the target network service; and obtain an identifier of a network based on the requirement information of the target network service, where the network meets the requirement information of the target network service. The network management unit further includes an association module configured to: configure an association relationship between the identifier of the target network service and the identifier of the network; or configure, by the network management module, the identifier of the target network service in management information of the network; or configure, by the network management module, the identifier of the network in management information of the target network service.

For an implementation of the network management unit, refer to behavior and a function of the network management unit in the network service management method provided in the first aspect or the possible implementations of the first aspect. Details are not described herein again. Therefore, with the network management unit provided in this aspect, a same beneficial effect as that in the first aspect can be achieved.

According to an aspect, an embodiment of this application provides a network management unit. The network management unit is capable of implementing a function performed by the network management unit in the first aspect. The function may be implemented by hardware, or may be implemented by hardware by executing corresponding software. The hardware or the software includes one or more modules corresponding to the function.

In a possible design, a structure of the network management unit includes a processor and a communications interface. The processor is configured to support the network management unit in performing the corresponding function in the foregoing method. The communications interface is configured to support communication between the network management unit and another network element. The network management unit may further include a memory. The memory is configured to be coupled to the processor. The memory stores a program instruction and data that are necessary for the network management unit.

According to an aspect, an embodiment of this application provides a computer storage medium configured to store a computer software instruction used by the foregoing network management unit, where the computer software instruction includes a program used to perform the solution in the foregoing aspect.

According to an aspect, an embodiment of this application provides a computer program product. The program product stores a computer software instruction used by the foregoing network management unit, and the computer software instruction includes a program used to perform the solution in the foregoing aspect.

According to an aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, to enable the apparatus to perform a function corresponding to a network management unit in the foregoing method.

According to a second aspect, an embodiment of this application provides a network service management method, including: obtaining, by a network management unit, requirement information of a target network service; creating, by the network management unit, management information of the target network service, where the management information of the target network service includes an identifier of the management information of the target network service; and associating, by the network management unit, the management information of the target network service with a network, where the network meets the requirement information of the target network service. The requirement information of the target network service is requirement information of a target network slice, and that the network meets the requirement information of the target network service may be alternatively described as that the network meets the requirement information of the target network slice. Associating, by the network management unit, the management information of the target network service with a network may be alternatively described as configuring, by the network management unit, a relationship between the identifier of the management information of the target network service and an identifier of the network.

Based on the foregoing implementation, the network management unit may associate the management information of the target network service with the network. Because the requirement information of the target network service is configured in the management information of the target network service, and the target network service is a service carried in the network, different services carried in the network can be well distinguished in a scenario in which the network carries a plurality of services, thereby implementing dynamic management by the network management unit on the different services carried in the network.

With reference to the second aspect, in a possible implementation, obtaining, by a network management unit, requirement information of a target network service includes: receiving, by the network management unit, a network management request; and obtaining the requirement information of the target network service from the network management request, where the network management request carries the requirement information of the target network service, and the network management request includes any one of the following requests: a network creation request, a network allocation request, a network modification request, a network service migration request, or a network activation request. In this possible implementation, the requirement information of the target network service may be replaced with the requirement information of the target network slice.

It should be noted that when the network management request is the network service migration request, and the network service migration request is used to request to migrate the target network service from a source network to a destination network, the network management request further carries an identifier of the source network and an identifier of the destination network.

In this way, the requirement information of the target network service can be carried in the network management request and sent to the network management unit, thereby improving information sending security.

With reference to the possible implementation of the second aspect, in another possible implementation, receiving, by the network management unit, a network management request includes receiving, by the network management unit, the network management request from a service management unit. Correspondingly, the method further includes returning, by the network management unit, the identifier of the management information of the target network service to the service management unit.

With reference to the second aspect or the possible implementations of the second aspect, in another possible implementation, before associating, by the network management unit, the management information of the target network service with a network, the method further includes determining, by the network management unit, the network based on the requirement information of the target network service. Alternatively, this may be described as follows: Before configuring, by the network management unit, a relationship between the identifier of the management information of the target network service and an identifier of the network, the method further includes determining, by the network management unit, the network based on the requirement information of the target network slice.

With reference to any one of the second aspect or the possible implementations of the second aspect, in still another possible implementation, associating, by the network management unit, the management information of the target network service with a network includes: configuring, by the network management unit, a relationship between the identifier of the management information of the target network service and an identifier of the network; or configuring, by the network management unit, the identifier of the management information of the target network service; or configuring, by the network management unit, the identifier of the management information of the target network service and the requirement information of the target network service in management information of the network.

With reference to any one of the second aspect or the possible implementations of the second aspect, in still another possible implementation, the method further includes allocating, by an allocation module, the identifier to the management information of the target network service, where the identifier of the management information of the target network service is used to identify the management information of the target network service.

With reference to any one of the second aspect or the possible implementations of the second aspect, in still another possible implementation, the identifier of the target network service includes any one of the following identifiers: a network request identifier, a tenant identifier, a service identifier, a tenant service identifier, a network service requirement information identifier, a network requirement information identifier, or a network service management information identifier. The network service requirement information identifier may be alternatively described as a network slice requirement information identifier.

According to another aspect, an embodiment of this application provides a network management unit, including: an obtaining module configured to obtain requirement information of a target network service, where the requirement information of the target network service is requirement information of a target network slice; a determining module configured to create management information of the target network service, where the management information of the target network service includes the requirement information of the target network service; an allocation module configured to allocate an identifier of the management information of the target network service, where the identifier of the management information of the target network service is used to identify the management information of the target network service; and an association module configured to associate the management information of the target network service with a network, where the network meets the requirement information of the target network service, or this may be described as that the network meets the requirement information of the target network slice.

For an implementation of the network management unit, refer to behavior and a function of the network management unit in the network service management method provided in the second aspect or the possible implementations of the second aspect. Details are not described herein again. Therefore, with the network management unit provided in this aspect, a same beneficial effect as that in the second aspect can be achieved.

According to another aspect, an embodiment of this application provides a network management unit. The network management unit is capable of implementing a function performed by the network management unit in the second aspect. The function may be implemented by hardware, or may be implemented by hardware by executing corresponding software. The hardware or the software includes one or more modules corresponding to the function.

In a possible design, a structure of the network management unit includes a processor and a communications interface. The processor is configured to support the network management unit in performing the corresponding function in the method in the second aspect. The communications interface is configured to support communication between the network management unit and another network element. The network management unit may further include a memory. The memory is configured to be coupled to the processor. The memory stores a program instruction and data that are necessary for the network management unit.

According to another aspect, an embodiment of this application provides a computer storage medium configured to store a computer software instruction used by the foregoing network management unit, where the computer software instruction includes a program used to perform the solution in the foregoing aspect.

According to another aspect, an embodiment of this application provides a computer program product. The program product stores a computer software instruction used by the foregoing network management unit, and the computer software instruction includes a program used to perform the solution in the foregoing aspect.

According to another aspect, an embodiment of this application provides an apparatus. The apparatus exists in a product form of a chip. A structure of the apparatus includes a processor and a memory. The memory is configured to be coupled to the processor, and stores a program instruction and data that are necessary for the apparatus. The processor is configured to execute the program instruction stored in the memory, to enable the apparatus to perform a function corresponding to a network management unit in the foregoing method.

According to still another aspect, an embodiment of this application provides a network service management system, including a service management unit and the network management unit according to any one of the foregoing aspects or any possible implementation of any one of the foregoing aspects.

DESCRIPTION OF EMBODIMENTS

The following describes implementations in embodiments of this application in detail with reference to the accompanying drawings.

Before the technical solutions are described, to facilitate understanding of the technical solutions in the embodiments of this application, some terms in the embodiments of this application are explained.

Network slice: may also be referred to as a network slice instance, and is a combination of network function (NF) and resources that ensure that a bearer service can meet a service level agreement (SLA) requirement. Hard isolation (for example, physical isolation) or soft isolation (for example, logical isolation) may be performed on these NFs and resources based on different requirements. Each network slice is logically independent. The network slice may include at least a core network (CN), an access network (AN), and a transport network (TN), or may include any one or two of a CN, an AN, or a TN.

In the embodiments of this application, the network slice is a broad concept. It may be considered that a conventional network or a dedicated network is also a network slice, or it may be considered that a network slice subnet is also a network slice.

Network slice subnet: may be referred to as a network slice subnet instance, and is a combination of network functions and resources that ensure that a bearer service can meet an SLA requirement. Usually, the network slice subnet may be obtained by slicing a network slice, or a network slice may be directly used as the network slice subnet.

Tenant: is a user (e.g., an Anaqua user) such as an enterprise, a factory, or a school that uses a network slice or a network slice subnet to implement a service function.

Figure 1:
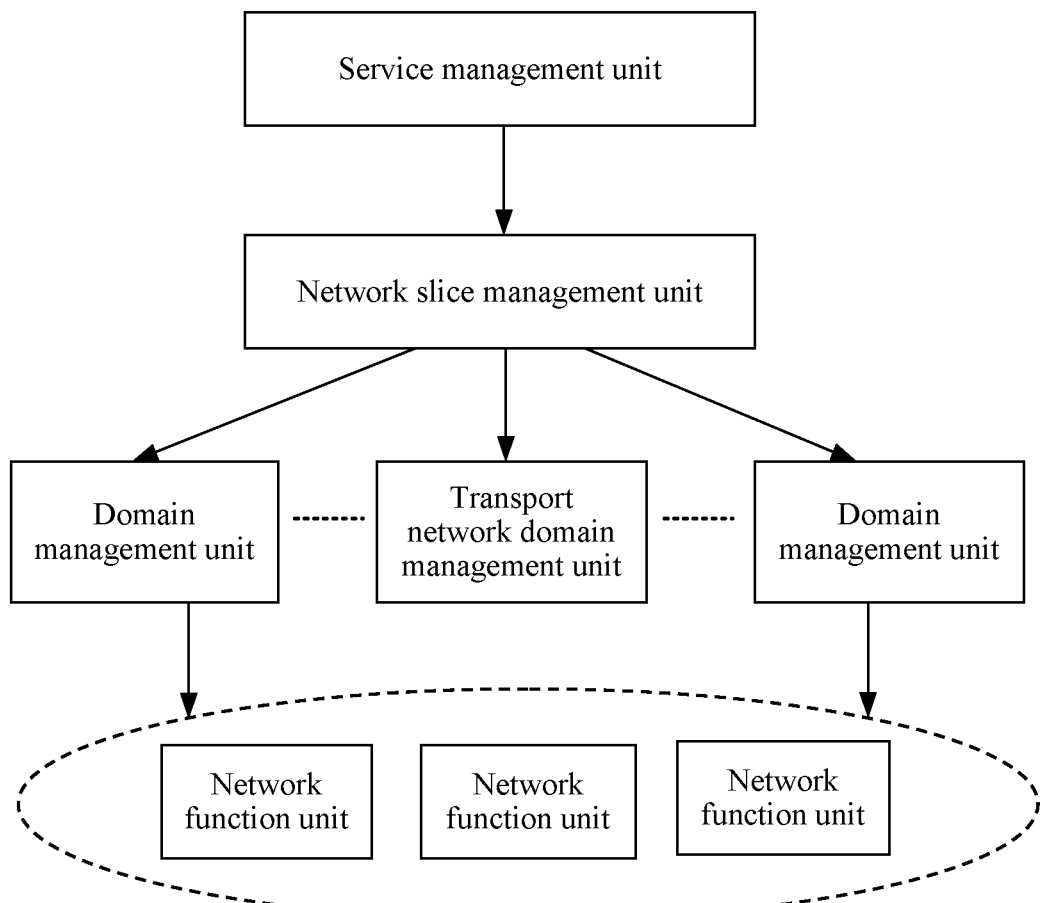
FIG. 1 is a simplified schematic diagram of a system architecture according to an embodiment of this application.

As shown in FIG. 1, a network architecture may include a service management unit, a network slice management unit, component management units, a transport network domain manager (TN-DM), and network function (NF) units. Data or a signaling message may be transmitted between the component management units using the TN-DM. A plurality of NFs may form a network slice or a network slice subnet.

The service management unit in FIG. 1 may be a service management function (SMF) unit, and is mainly configured to: receive a service requirement of a tenant; convert the service requirement into a network slice requirement; and perform service management. The service management unit may be deployed in an operation support system (OSS), or may be deployed outside the OSS. The service management unit may be a management or operation system of a third party (such as a tenant). The service management unit may be independently deployed, or may be integrated into a management unit (such as a business support system (BSS), a service management unit, a service orchestration unit, or a service management and orchestration unit). It should be noted that the service management unit in FIG. 1 is not limited to being named as the SMF unit, and may be alternatively named as a customer service management function unit or a communication service management function (CSMF) unit.

The network slice management unit in FIG. 1 may be a network slice management function (NSMF) unit, and mainly includes one or both of an end-to-end network management function and an end-to-end network orchestration function. The network slice management unit may have some or all of the following functions: end-to-end network management (for example, network life cycle management, network template management, network fault management, network performance management, and network configuration management), end-to-end network, subnet, and network function mapping, coordination of network resources or sub-SLAs provided by different domains (for example, an access network domain, a core network domain, and a transmission domain), splitting of network requirement information into subnet requirement information, and centralized orchestration on subnets and network resources provided by all subdomains, such that subnets or network functions provided by different subdomains can meet a requirement (for example, an SLA requirement, a key performance indicator (KPI) requirement, and a quality of service (QoS) requirement) of a target service or network. The network slice management unit may be deployed in an OSS, or may be deployed outside the OSS. The network slice management unit may be independently deployed, or may be integrated into a management unit (such as a network orchestration unit, a network management and orchestration unit, a service management unit, a service orchestration unit, a service management and orchestration unit, or a network functions virtualization orchestrator (NFVO)). It should be noted that the network slice management unit in FIG. 1 is not limited to being named as an NM, and may be alternatively named as a cross-domain management unit, a cross-domain network slice management unit, a network management (NM) function unit, or the like.

The component management unit in FIG. 1 may be a domain management (DM) unit, and includes one or both of a subnet management function and a subnet orchestration function. The component management unit may have some or all of the following functions: domain management (including subnet life cycle management (creation, update, and deletion), subnet fault management, subnet performance management, subnet configuration management, and the like), service management (including service life cycle management, service fault management, service performance management, service configuration management, and the like), and network resource (for example, NF unit or network element (NE)) coordination, and is used for centralized orchestration. The component management unit may be deployed in an OSS, or may be deployed outside the OSS. The component management unit may be independently deployed, or may be integrated into a management unit (such as a network slice management unit, a network orchestration unit, a network management and orchestration unit, a network element management unit, a network function management unit, a service management unit, a service orchestration unit, a service management and orchestration unit, or an NFVO). It should be noted that the component management unit in FIG. 1 is not limited to being named as the DM unit, and may be alternatively named as a domain slice management unit, a network slice subnet management unit, or the like.

For example, a subnet managed by the component management unit may include one or more of the following parts: an AN, a CN, and a TN. When the subnet managed by the component management unit includes only the AN, the subnet management unit may be considered as an AN DM. When the subnet managed by the component management unit includes only the CN, the subnet management unit may be considered as a CN DM. When the subnet managed by the component management unit includes the AN and the CN, the subnet management unit may be considered as a mix DM.

The TN-DM in FIG. 1 includes one or both of a transport network management function and a transport network orchestration function. The TN-DM may have some or all of the following functions: transport network management (including transport network life cycle management (creation, update, and deletion), transport network fault management, transport network performance management, transport network configuration management, and the like). The TN-DM may be deployed in an OSS, or may be deployed outside the OSS. The TN-DM may be independently deployed, or may be integrated into a management unit (such as a network slice management unit, a network orchestration unit, a network management and orchestration unit, a component management unit, a network element management unit, a service management unit, a service orchestration unit, a service management and orchestration unit, or an NFVO). It should be noted that the TN-DM is not limited to the name shown in FIG. 1, and the TN-DM may be alternatively named as a (transport network) subnet management unit, a network slice transport network management unit, or the like.

It should be noted that FIG. 1 is only an example architectural diagram. In addition to the function nodes shown in FIG. 1, the network architecture may further include another function node. For example, in addition to the management units shown in FIG. 1, the network architecture further includes a network function management (manager) unit. The NF manager unit includes one or all of the following functions: network function life cycle management, network function fault management, network function performance management, network function configuration management, and the like. In this application, a name of the NF manager is not limited, and may be alternatively a network element manager (EM). The NF manager may be deployed in the component management unit. In other words, the component management unit includes a function of the NF manager. Alternatively, the NF manager may be deployed independently of the component management unit, and there is a network function management interface between the NF manager and the component management unit.

Figure 2:
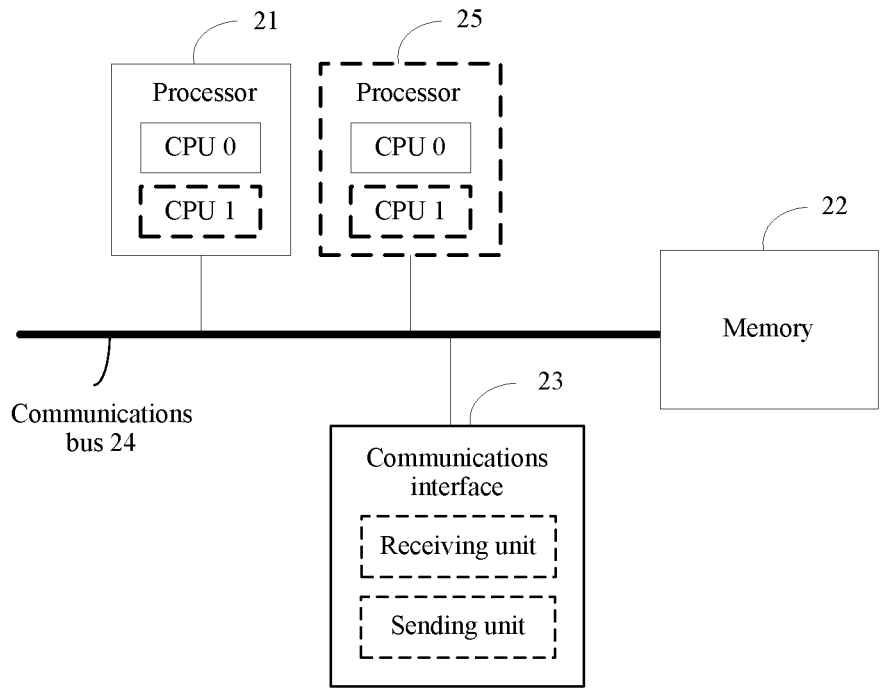
FIG. 2 is a schematic composition diagram of a network management unit according to an embodiment of this application.

For example, the service management unit, the network slice management unit, and the domain management unit in FIG. 1 may be collectively referred to as a network management unit that may include components shown in FIG. 2. FIG. 2 is a schematic composition diagram of a network management unit according to an embodiment of this application. As shown in FIG. 2, the management unit may include at least one processor 21, a memory 22, a communications interface 23, and a communications bus 24. It should be noted that the device structure shown in FIG. 2 constitutes no limitation on the management unit. The management unit may include more or fewer components than those shown in the figure, or combine some components, or have different component arrangements. This is not limited in this embodiment of this application. The following describes the components of the management unit in detail with reference to FIG. 2.

The processor 21 is a control center of the management unit, and may be one processor, or may be a general name of a plurality of processing elements. For example, the processor 21 may be a central processing unit (CPU), or may be an application-specific integrated circuit (ASIC), or may be configured as one or more integrated circuits implementing the embodiments of this application, for example, one or more microprocessors (e.g. digital signal processor (DSP)) or one or more field programmable gate arrays (FPGA). The processor 21 may perform various functions of the management unit by running or executing a software program stored in the memory 22 and by invoking data stored in the memory 22.

In implementation, in an embodiment, the processor 21 may include one or more CPUs, for example, a CPU 0 and a CPU 1 that are shown in FIG. 2. In implementation, in an embodiment, the management unit may include a plurality of processors, for example, the processor 21 and a processor 25 that are shown in FIG. 2. Each of these processors may be a single-core (single-CPU) processor, or may be a multi-core (multi-CPU) processor. The processor herein may be one or more devices, circuits, and/or processing cores configured to process data (such as a computer program instruction).

The memory 22 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 22 is not limited thereto. The memory 22 may exist independently, and is connected to the processor 21 using the communications bus 24. Alternatively, the memory 22 may be integrated into the processor 21. The memory 22 is configured to store a software program for performing the solutions provided in the embodiments of this application, and the processor 21 controls execution of the software program.

The communications interface 23 is configured to communicate with another device or a communications network, such as the Ethernet, a radio access network (RAN), or a wireless local area network (WLAN). The communications interface 23 may include a receiving unit for implementing a receiving function and a sending unit for implementing a sending function.

The communications bus 24 may be an industry standard architecture (ISA) bus, a peripheral component interconnect (PCI) bus, an extended industry standard architecture (EISA) bus, or the like. The bus may be classified as an address bus, a data bus, a control bus, or the like. For ease of representation, only one thick line is used to represent the bus in FIG. 2, but this does not mean that there is only one bus or only one type of bus.

Figure 3:
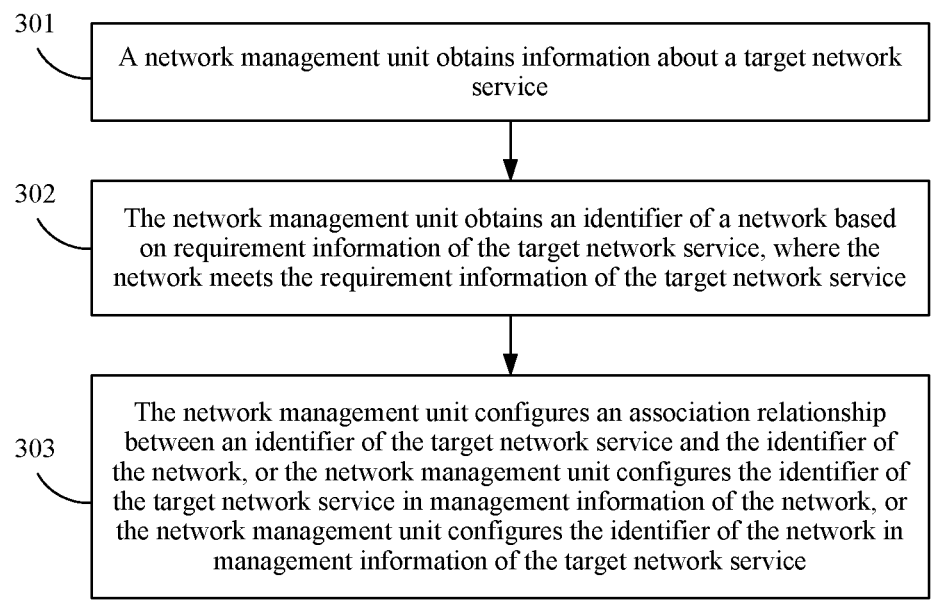
FIG. 3 is a flowchart of a network service management method according to an embodiment of this application.

With reference to the communications system shown in FIG. 1, the following describes in detail a network service management method provided in the embodiments of this application. FIG. 3 is a flowchart of a network service management method according to an embodiment of this application. As shown in FIG. 3, the method may include the following steps.

Step 301: A network management unit obtains information about a target network service.

The network management unit may be the network slice management unit or the domain management unit in FIG. 1.

The information about the target network service may be information about a network, and may include an identifier of the target network service and requirement information of the target network service. The identifier of the target network service is used to identify the target network service, and is used to identify a network requirement of a service. The identifier of the target network service may include any one of the following identifiers: a network request identifier, a tenant identifier, a service identifier, a tenant service identifier, a network service requirement information identifier, network slice selection assistance information, a network service management information identifier, a network requirement information identifier, or the like. This is not limited. The network service requirement information identifier may be alternatively a network requirement information identifier.

The requirement information of the target network service may be requirement information of the network, for example, requirement information of a target network slice. The requirement information of the target network service may be used to describe a requirement of the target network service or a requirement of the network. The requirement information of the target network service may include at least one of the following information: a quantity of users, area distribution of the users, a service transmission status of a user, an activation ratio of the users, a use time of the service, a coverage area of the service or the network, a movement status of the user, a roaming status of the user, a latency of the network, a bandwidth of the network, a throughput of the network, reliability of the network, a coverage level of the network, or a coverage area of the network.

The user may correspond to a device (such as a terminal device) that can obtain or use a service of the tenant, and the user may be a tenant. For example, the terminal device may be a device such as an electricity meter that records an amount of electricity used by the tenant, and the user may correspond to the terminal device. For example, the user may use the terminal device.

A service requested by the tenant may be a service function performed by a user corresponding to the tenant. For example, the user is an electricity meter that records an amount of electricity used by the tenant, and the service requested by the tenant may be an electricity meter reading service.

The quantity of users may be a quantity of users or devices that is capable of obtaining or using a service of the tenant.

The area distribution of the users may be an area deployment status of users or devices that can obtain or use a service of the tenant. The quantity of users and the area distribution status of the users may be combined as one type of information in service traffic information of a network slice. For example, there are 100 users in an area 1 and 200 users in an area 2.

The service transmission status of the user may be a service use status of the user, for example, a time period for sending/receiving the service by the user, a packet size for sending/receiving the service by the user, power for sending/receiving the service by the user, and a bandwidth size for sending/receiving the service by the user. For example, the user is an electricity meter that records an amount of electricity used by the tenant, and the service transmission status of the user is as follows: The electricity meter sends a packet once a day, and a size of the packet sent each time is 20 M.

The activation ratio of the users may be a ratio of a quantity of users in an activated state to a quantity of all users, or may be a ratio of a quantity of users in an activated state to a quantity of all users at a specific moment.

The use time of the service may be a time at which the user uses the service. For example, the electricity meter reading service is performed on the last day of each month.

The coverage area of the service may be used to indicate a coverage status of the service, and may be a coverage level or a coverage scenario of the service. For example, the coverage scenario of the service is indoor coverage, outdoor coverage, suburban coverage, subway coverage, tunnel coverage, or the like. The coverage level of the service may be strong coverage, normal coverage, weak coverage, or the like.

The movement status of the user may include at least one of the following statuses: whether the user moves, a quantity of users in a moving state, and a moving level of the user. The moving level of the user may include one or more of the following: fast, medium-speed, slow, immobile, or the like.

The roaming status of the user may include at least one of the following statuses: whether the user roams, quantities of users who may roam at different moments, and the like.

The latency of the network may be a response time of the network. For example, a latency of a network is 10 milliseconds (ms).

The bandwidth of the network may be a bandwidth that can be provided by the network. For example, a bandwidth of a network is 10 megahertz (MHz).

The throughput of the network may be used to describe a data forwarding capability of the network. For example, a throughput of a network is 100 megabits per second (Mbit/s), indicating that the network slice supports transmission of 100-Mbit data in one second.

The reliability of the network may be used to describe a data forwarding capability of the network. For example, a throughput of a network is 100 megabits per second (Mbit/s), indicating that the network slice supports transmission of 100-Mbit data in one second.

The coverage level of the network may include a coverage level of a network slice, and is used to indicate coverage strength of the network. Herein, the coverage strength may be represented using strong coverage, normal coverage, weak coverage, or the like, or may be represented using indoor coverage, outdoor coverage, suburban coverage, or the like.

The coverage area of the network may be used to describe a network coverage area in which the network is used, for example, Shanghai.

In a possible implementation, the network management unit is the network slice management unit in FIG. 1, the target network service is a network slice service, the information about the target network service is information about the network slice service, the identifier of the target network service is an identifier of the network slice service, and the requirement information of the target network service is requirement information of the network slice service. The network slice management unit receives, from a service management unit, a network management request that carries the information about the network slice service, and obtains the information about the network slice service based on the network management request. The information about the network slice service is obtained by the service management unit based on service requirement information, and the service requirement information is requirement information of the service requested by the tenant. For example, when the service requested by the tenant is carried in one network slice, the service management unit may directly use, as the identifier of the network slice service, an identifier of the service requested by the tenant, and the service management unit may use the service requirement information as the requirement information of the network slice service; or when the service requested by the tenant is carried in at least two network slices, the service management unit splits the service requested by the tenant into at least two network slice services, splits the service requirement information into requirement information of the at least two network slice services, and allocates, to each network slice service, an identifier of the network slice service. It should be noted that the network slice service may be alternatively named as a network slice service management object, network slice requirement information, or the like. This is not limited.

In another possible implementation, the network management unit is the domain management unit in FIG. 1, the target network service is a network slice subnet service, the information about the target network service is information about the network slice subnet service, the identifier of the target network service is an identifier of the network slice subnet service, and the requirement information of the target network service is requirement information of the network slice subnet service. The domain management unit receives, from a network slice management unit, a network management request that carries the information about the network slice subnet service, and obtains the information about the network slice subnet service based on the network management request. The information about the network slice subnet service is obtained by the network slice management unit based on information about a network slice service. For example, when the network slice service is carried in one network slice subnet, the network slice management unit directly uses an identifier of the network slice service as the identifier of the network slice subnet service, and uses requirement information of the network slice service as the requirement information of the network slice subnet service. Alternatively, when the network slice service is carried in at least two network slice subnets, the network slice management unit splits the network slice service into at least two network slice subnet services, splits requirement information of the network slice service into requirement information of the at least two network slice subnet services, and allocates, to each network slice subnet service, an identifier of the network slice subnet service. It should be noted that the network slice subnet service may be alternatively named as a network slice subnet service management object or the like. This is not limited.

In the foregoing possible implementations, the network management request may include any one of the following requests: a network creation request, a network allocation request, a network modification request, a network service migration request, or a network activation request.

The network creation request is used to request to create a network instance.

The network modification request is used to request to modify a network instance. Optionally, when the foregoing request is the network modification request, the foregoing request further carries a network modification type and/or an identifier of the network. The network modification type includes at least one of the following: adding a network service, removing a network service, and deleting a network service.

The network service migration request is used to request to migrate a network service from a source network to a destination network. When the network management request is the network service migration request, and the network service migration request is used to request to migrate the target network service from a source network to a destination network, the network management request further carries an identifier of the source network and an identifier of the destination network. The source network and the target network are relative concepts, the source network is a network that carries the target network service before a current moment, and the target network is a network that carries the target network service after the current moment. It should be noted that, in this application, when the target network service is the network slice service, a network that carries the target network service is a network slice, or when the target network service is the network slice subnet service, a network that carries the target network service is a network slice subnet.

The network activation request is used to request to activate a network service. Optionally, a network slice activation request carries an identifier of the network.

Step 302: The network management unit obtains the identifier of the network based on the requirement information of the target network service, where the network meets the requirement information of the target network service.

The network may be a network slice, a network slice subnet, or a subnet. The identifier of the network is used to identify the network, and may be a number, a letter, or another identifier. This is not limited. When the network management unit is the network slice management unit in FIG. 1, the network is the network slice, and the identifier of the network is an identifier of the network slice. When the network management unit is the domain management unit in FIG. 1, the network is the network slice subnet, and the identifier of the network is an identifier of the network slice subnet.

In a possible implementation, when an available network that meets the requirement of the target network service exists in existing networks, the network management unit selects, from the existing networks, the available network that meets the requirement of the network service, obtains an identifier of the available network, and uses the identifier of the available network as the identifier of the network in step 302.

Selecting, from the existing networks, the available network that meets the target network service may mean that when a network (a network slice or a network subnet) that meets the requirement information of the target network service exists in the existing networks, or when a network that can be modified (for example, expanded) to meet the requirement information of the target network service exists in the existing networks, or when the network management unit receives a message used to instruct to reuse a network in the existing networks, the network management unit selects the available network from the existing networks.

In another possible implementation, when no network that meets the requirement information of the target network service exists in the existing networks, the network management unit creates a network based on the requirement information of the target network service, uses the created new network as the network in step 302, and allocates an identifier to the network.

That the network management unit creates a network may mean that the network management unit combines available network resources (including at least one of the following information: network functions and transmission resources) in the existing networks into the network to meet the requirement information of the target network service.

Step 303: The network management unit configures an association relationship between the identifier of the target network service and the identifier of the network, or the network management unit configures the identifier of the target network service in management information of the network, or the network management unit configures the identifier of the network in management information of the target network service.

That the network management unit configures an association relationship between the identifier of the target network service and the identifier of the network may mean that the network management unit maintains the association relationship between the identifier of the target network service and the identifier of the network, or that the network management unit correspondingly stores the identifier of the target network service and the identifier of the network.

That the network management unit configures the identifier of the target network service in management information of the network may mean that the network management unit stores the identifier of the target network service in the management information of the network, where the management information of the network may be information indicating the network.

That the network management unit configures the identifier of the network in management information of the target network service may mean that the network management unit correspondingly stores the identifier of the network in the management information of the target network service, where the management information of the target network service may be the information about the target network service and is used to indicate the target network service.

In a possible implementation, the target network service is a network slice service, the network is a network slice, and the network management unit is the network slice management unit in FIG. 1. In this case, step 303 may be replaced with the following: The network slice management unit configures an association relationship between an identifier of the network slice service and an identifier of the network slice, or the network slice management unit configures the identifier of the network slice service in management information of the network slice, or the network slice management unit configures the identifier of the network slice in management information of the network slice service.

In another possible implementation, the target network service is a network slice subnet service, the network is a network slice subnet, and the network management unit is the domain management unit in FIG. 1. In this case, step 303 may be replaced with the following: The domain management unit configures an association relationship between an identifier of the network slice subnet service and an identifier of the network slice subnet, or the domain management unit configures the identifier of the network slice subnet service in management information of the network slice subnet, or the domain management unit configures the identifier of the network slice subnet in management information of the network slice subnet service.

Compared with other approaches, in the solution shown in FIG. 3, the network management unit may associate the target network service with the network. Because the target network service is a service carried in the network, different services carried in the network can be well distinguished in a scenario in which the network carries a plurality of services, thereby implementing dynamic management by the network management unit on the different services carried in the network.

Optionally, in the solution shown in FIG. 3, the method further includes configuring, by the network management unit, the requirement information of the target network service in the management information of the network, such that requirement information of a service carried in the network can be well determined.

Optionally, when the network management unit is the network slice management unit in FIG. 1, and the target network service is a network slice service, the method further includes: determining, by the network management unit, requirement information of at least one network slice subnet service based on the requirement information of the target network service; and allocating, by the network management unit to each of the at least one network slice subnet service, an identifier of the network slice subnet service.

When the network management unit determines that the target network service can be split into the at least one network slice subnet, the network management unit determines the requirement information of the target network service as the requirement information of the at least one network slice subnet service.

Further, after allocating, by the network management unit to each of the at least one network slice subnet service, an identifier of the network slice subnet service, the method further includes configuring, by the network management unit, an association relationship between the identifier of the network slice subnet service and the identifier of the target network service.

Compared with other approaches, in the solution shown in FIG. 3, the target network service may correspond to the network slice subnet service, to better determine a plurality of network slice subnet services included in the target network service.

Figure 4:
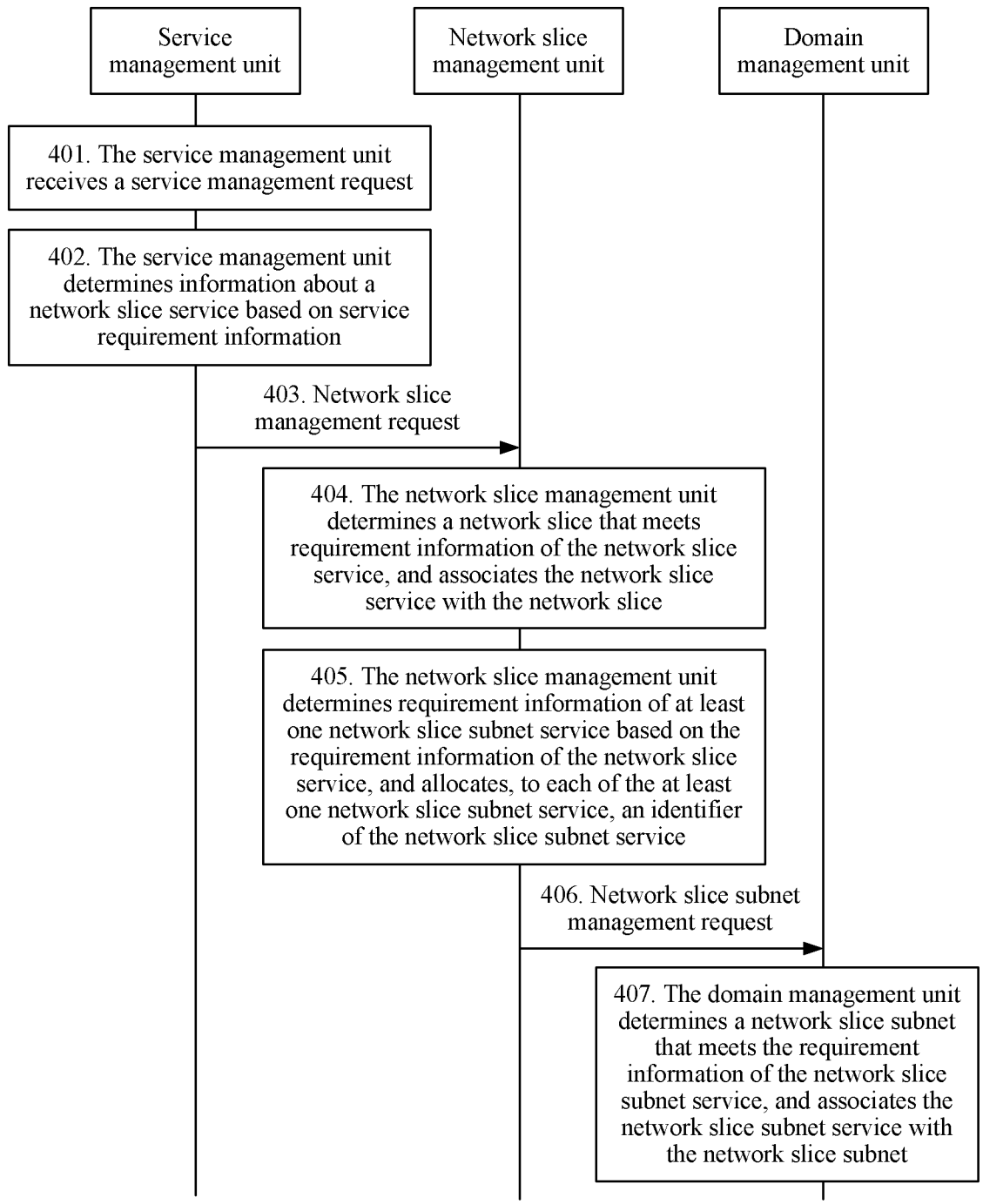
FIG. 4 is a flowchart of a network service management method according to an embodiment of this application.

The following describes the solution shown in FIG. 3 in detail using an example in which the network management unit is the network slice management unit in FIG. 1. FIG. 4 shows another network service management method according to an embodiment of this application. The method is performed by the units shown in FIG. 1 through interaction, and the method may include the following steps.

Step 401: A service management unit receives a service management request.

The service management request carries service requirement information, and the service requirement information includes at least one of the following information: a quantity of users, area distribution of the users, a service transmission status of a user, an activation ratio of the users, a use time of a service, a coverage area of the service or a network, a movement status of the user, a roaming status of the user, a latency of the network, a bandwidth of the network, a throughput of the network, reliability of the network, a coverage level of the network, or a coverage area of the network. For a detailed description of the service requirement information, refer to the description of the requirement information of the target network service in the solution shown in FIG. 3. Details are not described herein again.

Optionally, the service management unit receives the service management request sent by a tenant.

Step 402: The service management unit determines information about a network slice service based on the service requirement information.

The information about the network slice service includes an identifier of the network slice service and requirement information of the network slice service. When the service is carried in one network slice, one network slice service is created, an identifier of the network slice service is allocated, and an attribute of the network slice service is set, that is, requirement information of the network slice service is configured on the network slice service. When the service is carried in a plurality of network slices, the service requirement information is split into requirement information of a plurality of network slice services, identifiers of the network slice services are allocated, and attributes of the network slice services are set, that is, requirement information of the network slice services is configured on the network slice services.

Step 403: The service management unit sends a network slice management request to a network slice management unit.

The network slice management request may carry the information about the network slice service, and the network slice management request may be the network management request in the solution shown in FIG. 3. Details are not described herein again.

Step 404: The network slice management unit determines a network slice that meets the requirement information of the network slice service, and associates the network slice service with the network slice.

The network slice management unit may use an existing available network slice or create a new network slice to meet the requirement information of the network slice service.

That the network slice management unit associates the network slice service with the network slice may include: configuring, by the network slice management unit, an association relationship between the identifier of the network slice service and an identifier of the network slice, or configuring, by the network slice management unit, the identifier of the network slice service in management information of the network slice; or configuring, by the network slice management unit, the identifier of the network slice in management information of the network slice service. This process is the same as step 303 in the solution shown in FIG. 3. Details are not described herein again.

Step 405: The network slice management unit determines requirement information of at least one network slice subnet service based on the requirement information of the network slice service, and allocates, to each of the at least one network slice subnet service, an identifier of the network slice subnet service.

When the network slice service is carried in one network slice subnet of the network slice, one network slice subnet service is created, an identifier of the network slice subnet service is allocated, and an attribute of the network slice subnet service is set, that is, requirement information of the network slice subnet service is configured for the network slice subnet service. When the network slice service is carried in a plurality of network slice subnets of the network slice, the requirement information of the network slice service is split into requirement information of a plurality of network slice subnet services, the plurality of network slice subnet services are created, identifiers of the network slice subnet services are allocated, and attributes of the network slice subnet services are set, that is, corresponding requirement information of the network slice subnet services is configured on the network slice subnet services.

Step 406: The network slice management unit sends a network slice subnet management request to a domain management unit.

The network slice subnet management request may carry information about the network slice subnet service (the identifier of the network slice subnet service and requirement information of the network slice subnet service). The network slice management request may be the network management request in the solution shown in FIG. 3. Details are not described herein again.

Step 407: The domain management unit determines a network slice subnet that meets the requirement information of the network slice subnet service, and associates the network slice subnet service with the network slice subnet.

The domain management unit may use an existing available network slice subnet or create a new network slice subnet to meet the requirement information of the network slice subnet service.

That the domain management unit associates the network slice subnet service with the network slice subnet may include: configuring, by the domain management unit, an association relationship between the identifier of the network slice subnet service and an identifier of the network slice subnet; or configuring, by the domain management unit, the identifier of the network slice subnet service in management information of the network slice subnet; or configuring, by the domain management unit, the identifier of the network slice subnet in management information of the network slice subnet service. This process is the same as step 303 in the solution shown in FIG. 3. Details are not described herein again.

In another feasible solution, the network management unit may alternatively obtain only requirement information of a target network service, and create management information of the target network service based on the obtained requirement information of the target network service. Optionally, the network management unit may further allocate an identifier of the management information of the target network service to the target network service, set an attribute of the management information of the target network service, that is, configure the requirement information of the target network service in the management information of the target network service, and after determining a network that carries the target network service, associate the management information of the target network service with the network, where the identifier of the management information of the target network service is used to uniquely identify the management information of the target network service. For this solution, refer to FIG. 5.

Figure 5:
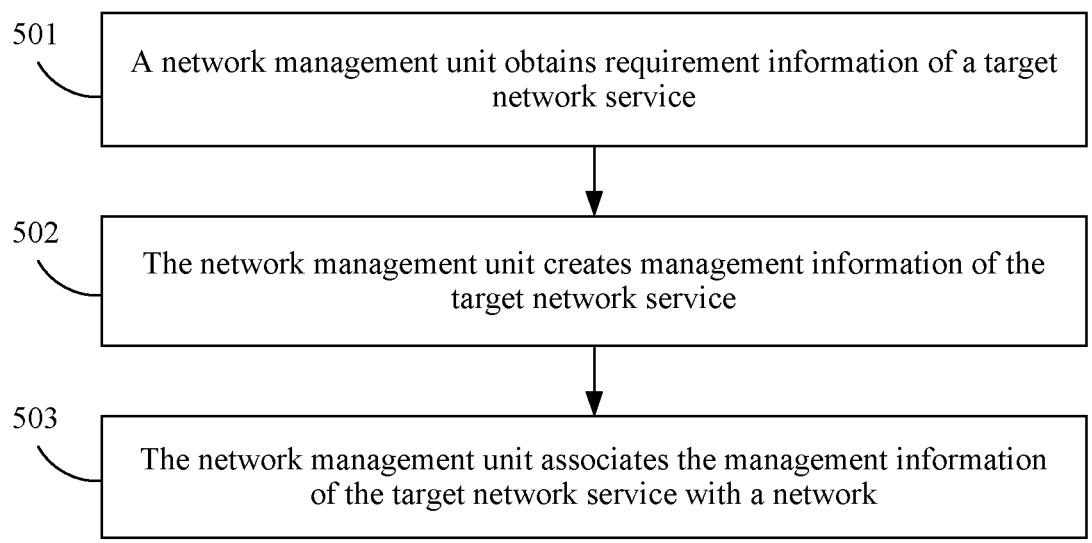
FIG. 5 is a flowchart of a network service management method according to an embodiment of this application.

FIG. 5 is a flowchart of another network service management method according to an embodiment of this application. As shown in FIG. 5, the method may include the following steps.

Step 501: A network management unit obtains requirement information of a target network service.

The network management unit may be the network slice management unit or the domain management unit in FIG. 1.

The requirement information of the target network service may be requirement information of a network, for example, may be requirement information of a target network slice. The requirement information of the target network service may be used to describe a requirement of the target network service or a requirement of the network. The requirement information of the target network service may include at least one of the following information: a quantity of users, area distribution of the users, a service transmission status of a user, an activation ratio of the users, a use time of the service, a coverage area of the service or the network, a movement status of the user, a roaming status of the user, a latency of the network, a bandwidth of the network, a throughput of the network, reliability of the network, a coverage level of the network, or a coverage area of the network. For the requirement information of the target network service, refer to the related description of the requirement information of the target network service in the solution shown in FIG. 3. Details are not described herein again.

In a possible implementation, the network management unit is the network slice management unit in FIG. 1, the target network service is a network slice service, and the requirement information of the target network service is requirement information of the network slice service. The network slice management unit receives, from a service management unit, a network management request that carries the requirement information of the network slice service, and obtains the requirement information of the network slice service based on the network management request. The requirement information of the network slice service is obtained by the service management unit based on service requirement information, and the service requirement information is requirement information of a service requested by a tenant. For example, when the service requested by the tenant is carried in one network slice, the service management unit directly uses the service requirement information as the requirement information of the network slice service. Alternatively, when the service requested by the tenant is carried in at least two network slices, the service management unit splits the service requested by the tenant into at least two network slice services, and splits the service requirement information into requirement information of the at least two network slice services. It should be noted that the network slice service may be alternatively named as a network slice service management object, network slice requirement information, or the like. This is not limited.

In another possible implementation, the network management unit is the domain management unit in FIG. 1, the target network service is a network slice subnet service, and the requirement information of the target network service is requirement information of the network slice subnet service. The domain management unit receives, from a network slice management unit, a network management request that carries the requirement information of the network slice subnet service, and obtains the requirement information of the network slice subnet service based on the network management request. The requirement information of the network slice subnet service is obtained by the network slice management unit based on requirement information of a network slice service. For example, when the network slice service is carried in one network slice subnet, the network slice management unit directly uses the requirement information of the network slice service as the requirement information of the network slice subnet service; or when the network slice service is carried in at least two network slice subnets, the network slice management unit splits the network slice service into at least two network slice subnet services, and splits the requirement information of the network slice service into requirement information of the at least two network slice subnet services. It should be noted that the network slice subnet service may be alternatively named as a network slice subnet service management object or the like. This is not limited.

In the foregoing possible implementations, the network management request may include any one of the following requests: a network creation request, a network allocation request, a network modification request, a network service migration request, or a network activation request. For the network management request, refer to the related description of the network management request in the solution shown in FIG. 3. Details are not described herein again.

Step 502: The network management unit creates management information of the target network service.

The management information of the target network service includes an identifier of the management information of the target network service, the identifier of the management information of the target network service is used to uniquely identify the management information of the target network service, and the requirement information of the target network service is configured in the management information of the target network service. That the network management unit creates management information of the target network service includes configuring, by the network management unit, the requirement information of the target network service in the management information of the network service.

Step 503: The network management unit associates the management information of the target network service with the network.

The network meets the requirement information of the target network service. When the target network service is a network slice service, the network is a network slice. When the target network service is a network slice subnet service, the network is a network slice subnet.

That the network management unit associates the management information of the target network service with the network includes: configuring, by the network management unit, a relationship between the identifier of the management information of the target network service and an identifier of the network; or configuring, by the network management unit, the identifier of the management information of the target network service in management information of the network; or configuring, by the network management unit, the identifier of the management information of the target network service and the requirement information of the target network service in the management information of the network.

Compared with other approaches, in the solution shown in FIG. 5, the target network service may correspond to the network slice subnet service, to better determine a plurality of network slice subnet services included in the target network service.

Optionally, in the solution shown in FIG. 5, before step 503, the method further includes determining, by the network management unit, the network that meets the target network service. For example, the network management unit may determine, from existing available networks, the network that meets the target network service. Alternatively, the network management unit deploys a new network to meet the requirement information of the target network service.

Optionally, in the solution shown in FIG. 5, the method further includes allocating, by the network management unit, the identifier to the management information of the target network service, where the identifier of the management information of the target network service is used to identify the management information of the target network service. Additionally, the identifier of the management information of the target network service may include but is not limited to any one of the following identifiers: a network request identifier, a tenant identifier, a service identifier, a tenant service identifier, a network service requirement information identifier, a network requirement information identifier, or a network service management information identifier. This is not limited. Management information of different target network services corresponds to different identifiers. The network service requirement information identifier may be alternatively described as a network slice requirement information identifier.

After allocating the identifier of the management information of the target network service, the network management unit further returns the identifier of the management information of the target network service. For example, when the network management unit is the network slice management unit in FIG. 1, the network management unit returns the identifier of management information of the target network service to the service management unit. Alternatively, when the network management unit is the domain management unit in FIG. 1, the network management unit returns the identifier of the management information of the target network service to the network slice management unit.

Figure 6A:
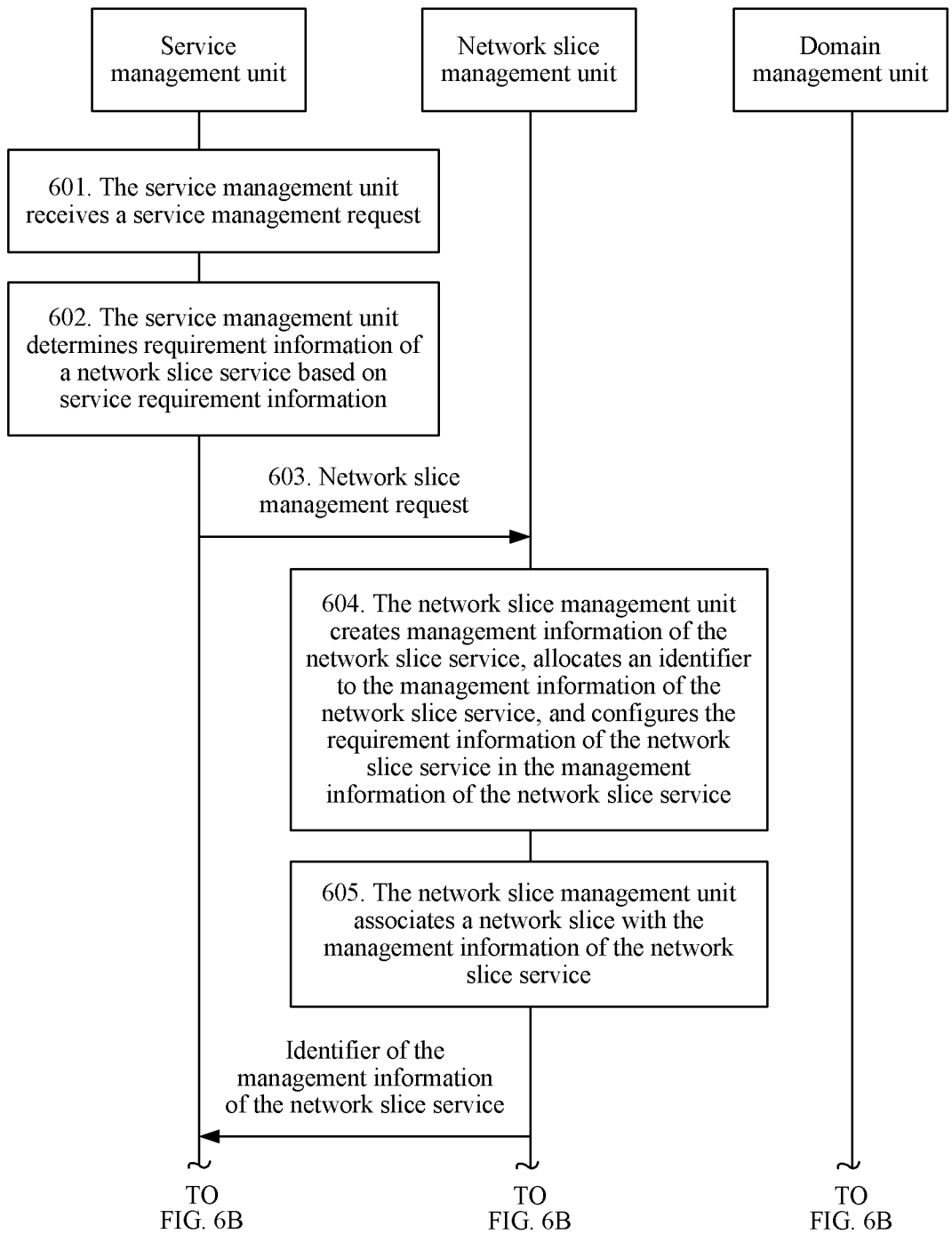
FIG. 6A and FIG. 6B are flowcharts of a network service management method according to an embodiment of this application.
Figure 6B:
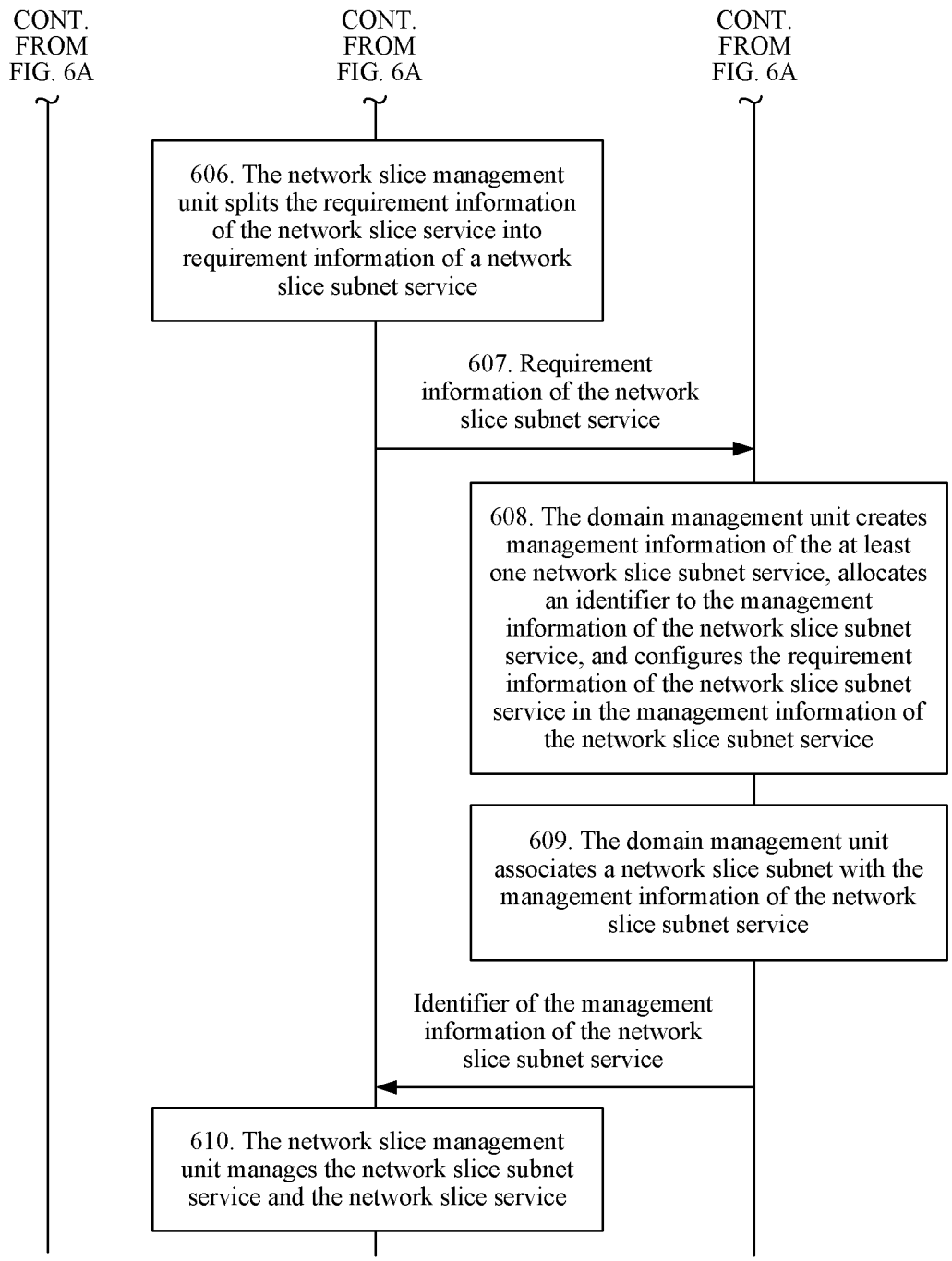

The following describes the solution, shown in FIG. 5, in detail using an example in which the network management unit is the network slice management unit in FIG. 1. FIG. 6A and FIG. 6B are flowcharts of still another network service management method according to an embodiment of this application. The method is performed through interaction by the units shown in FIG. 1. As shown in FIG. 6A and FIG. 6B, the method may include the following steps.

Step 601: A service management unit receives a service management request.

The service management request carries service requirement information, and the service requirement information includes at least one of the following information: a quantity of users, area distribution of the users, a service transmission status of a user, an activation ratio of the users, a use time of a service, a coverage area of the service or a network, a movement status of the user, a roaming status of the user, a latency of the network, a bandwidth of the network, a throughput of the network, reliability of the network, a coverage level of the network, or a coverage area of the network. For a detailed description of the service requirement information, refer to the description of the requirement information of the target network service in the solution shown in FIG. 3. Details are not described herein again.

Optionally, the service management unit receives the service management request sent by a tenant.

Step 602: The service management unit determines requirement information of a network slice service based on the service requirement information.

When the service is carried in one network slice, the service management unit determines the service requirement information as the requirement information of the network slice service. When the service is carried in at least two network slices, the service management unit splits the service requirement information into requirement information of at least two network slice services.

Step 603: The service management unit sends a network slice management request to a network slice management unit.

The network slice management request may carry the requirement information of the network slice service, and the network slice management request may be the network management request in the solution shown in FIG. 3. Details are not described herein again.

Step 604: The network slice management unit creates management information of the network slice service, allocates an identifier to the management information of the network slice service, and configures the requirement information of the network slice service in the management information of the network slice service.

The identifier of the management information of the network slice service may include two parts: an identifier and an index number of a network slice. Alternatively, the identifier of the management information of the network slice service may include only the index number. This is not limited. For example, when a network slice A carries a network slice service 1, the identifier of the management information of the network slice service may be network slice A+network slice service 1, or may be the network slice service 1.

Step 605: The network slice management unit associates the network slice with the management information of the network slice service, and returns the identifier of the management information of the network slice service.

The network slice management unit may further return the identifier of the management information of the network slice to the service management unit, such that the service management unit is clear about the network slice service carried in the network slice.

That the network slice management unit associates the network slice with the management information of the network slice service may include: configuring, by the network slice management unit, an association relationship between the identifier of the management information of the network slice service and the identifier of the network slice; or configuring, by the network slice management unit, the identifier of the management information of the network slice service in management information of the network; or configuring, by the network slice management unit, the identifier of the management information of the network slice service and the requirement information of the target network service in the management information of the network.

Step 606: The network slice management unit splits the requirement information of the network slice service into requirement information of a network slice subnet service.

When the network slice service is carried in one network slice subnet, the network management unit uses the requirement information of the network slice service as the requirement information of the network slice subnet service. When the network slice service is carried in at least two network slice subnets, the network management unit splits the requirement information of the network slice service into requirement information of at least two network slice subnet services.

Step 607: The network slice management unit sends the requirement information of the network slice subnet service to a domain management unit.

Step 608: The domain management unit creates management information of the at least one network slice subnet service, allocates an identifier to the management information of the network slice subnet service, and configures the requirement information of the network slice subnet service in the management information of the network slice subnet service.

Step 609: The domain management unit associates a network slice subnet with the management information of the network slice subnet service, and returns the identifier of the management information of the network slice subnet service.

That the domain management unit associates a network slice subnet with the management information of the network slice subnet service may include: configuring, by the domain management unit, an association relationship between the identifier of the management information of the network slice subnet service and an identifier of the network slice subnet; or configuring, by the domain management unit, the identifier of the management information of the network slice subnet service in management information of the network slice subnet; or configuring, by the domain management unit, the identifier of the management information of the network slice subnet service and the requirement information of the network slice subnet in the management information of the network slice subnet, or the like.

Step 610: The network slice management unit manages the network slice subnet service and the network slice service.

That the network slice management unit manages the network slice subnet service and the network slice service may mean that the network slice management unit correspondingly stores the network slice subnet service and the network slice service.

The solutions provided in the embodiments of this application are mainly described above from a perspective of interaction between nodes. It can be understood that to implement the foregoing functions, each node such as the network management unit includes a corresponding hardware structure and/or software module for implementing each function. A person skilled in the art should be aware that, in combination with the examples described in the embodiments disclosed in this specification, algorithm steps can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network management unit may be divided into function modules based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in the embodiments of this application, the module division is an example, and is merely logical function division. In actual implementation, there may be another division manner.

Figure 7:
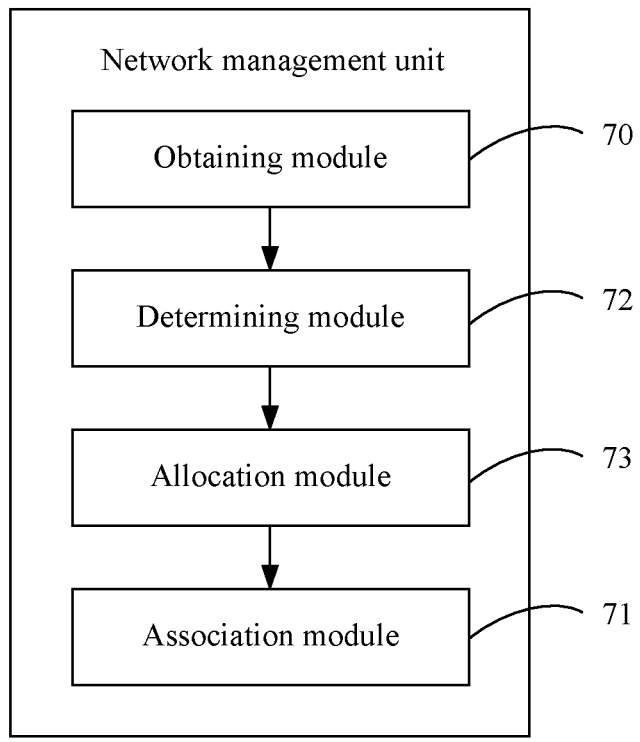
FIG. 7 is a schematic composition diagram of another network management unit according to an embodiment of this application.

When the function modules are obtained through division based on corresponding functions, FIG. 7 is another possible schematic composition diagram of a network management unit. The network management unit may be configured to perform a function of the network management unit in the foregoing embodiments. As shown in FIG. 7, the network management unit may include an obtaining module 70, an association module 71, a determining module 72, and an allocation module 73.

The obtaining module 70 is configured to support the network management unit in performing step 301, step 302, step 403, step 501, and step 603.

The association module 71 is configured to support the network management unit in performing step 303, step 503, and step 605.

The determining module 72 is configured to support the network management unit in performing step 405 and step 502.

The allocation module 73 is configured to support the network management unit in performing step 405, step 502, and step 604.

It should be noted that all related content of the steps in the foregoing method embodiments can be incorporated into function descriptions of corresponding function modules by reference. Details are not described herein again. The network management unit provided in this embodiment of this application is configured to perform the foregoing network service management method, and therefore can achieve a same effect as the foregoing network service management method.

Figure 8:
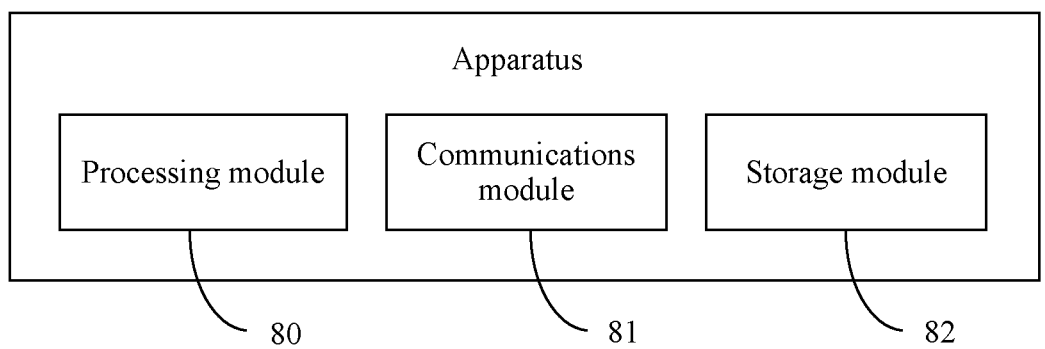
FIG. 8 is a schematic composition diagram of an apparatus according to an embodiment of this application.

When an integrated unit is used, FIG. 8 shows an apparatus. The apparatus exists in a product form of a chip and is configured to perform a function of the network management unit in the foregoing embodiments. As shown in FIG. 8, the apparatus may include a processing module 80 and a communications module 81.

The processing module 80 is configured to control and manage an action of the apparatus. For example, the processing module 80 is configured to support the apparatus in performing step 303, step 503, step 605, step 405, step 502, step 405, step 502, and step 604, and/or is configured to perform another process of the technology described in this specification. The communications module 81 is configured to support communication between the apparatus and another network entity, for example, communication with the service management unit or a network entity shown in FIG. 1. The apparatus may further include a storage module 82, configured to store program code and data of the apparatus.

The processing module 80 may be a processor or a controller. The processing module 80 may implement or execute various example logical blocks, modules, and circuits described with reference to content disclosed in this application. Alternatively, the processor may be a combination implementing a computing function, for example, a combination including one or more microprocessors, or a combination of a DSP and a microprocessor. The communications module 81 may be a communications interface, a transceiver circuit, or the like. The storage module 82 may be a memory.

When the processing module 80 is a processor, the communications module 81 is a communications interface, and the storage module 82 is a memory, the apparatus in this embodiment of this application may be the apparatus shown in FIG. 2.

The foregoing descriptions of the implementations allow a person skilled in the art to understand that, for the purpose of convenient and brief description, division of the foregoing function modules is used as an example for illustration. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to other approaches, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
sending a network management request, wherein the network management request is a network allocation request, wherein the network management request comprises information about a network slice, wherein the information about the network slice comprises requirement information of the network slice and a first identifier for the requirement information of the network slice, and wherein the requirement information of the network slice comprises a moving level of a user;
receiving the network management request, wherein network management request comprises the information about the network slice;
obtaining, based on the requirement information, a second identifier of a network slice instance, wherein the network slice instance meets the requirement information; and
configuring, in management information of the network slice instance, the requirement information.

2. The method of claim 1, wherein obtaining the second identifier comprises obtaining a third identifier of an existing network slice instance when the existing network slice instance meets the requirement information.

3. The method of claim 1, further comprising configuring, in the management information, the first identifier, wherein the requirement information comprises a network slice coverage area, and wherein the network slice coverage area describes a coverage area in which the network slice instance is used.

4. The method of claim 1, wherein the moving level is immobile.

5. The method of claim 1, wherein the moving level is fast.

6. The method of claim 1, wherein the moving level is medium-speed.

7. The method of claim 1, wherein the moving level is slow.

8. The method of claim 1, wherein obtaining the second identifier comprises:
creating, based on the requirement information, the network slice instance; and
allocating, to the network slice instance, the second identifier.

9. The method of claim 1, further comprising configuring, in the management information, the first identifier, wherein the requirement information comprises a quantity of second users.

10. The method of claim 1, further comprising configuring, in the management information, the first identifier, wherein the requirement information comprises a network latency.

11. A computer program product comprising instructions stored on a non-transitory computer-readable medium that, when executed one or more processors, perform a method comprising:
  sending a network management request, wherein the network management request is a network allocation request, wherein the network management request comprises information about a network slice, wherein the information about the network slice comprises requirement information of the network slice and a first identifier for the requirement information of the network slice, and wherein the requirement information of the network slice comprises a moving level of a user;
  receiving the network management request, wherein the network management request comprises the information about the network slice;
  obtaining, based on the requirement information, a second identifier of a network slice instance, wherein the network slice instance meets the requirement information; and
  configuring, in management information of the network slice instance, the requirement information.

12. The computer program product of claim 11, wherein obtaining the second identifier comprises obtaining a third identifier of an existing network slice instance when the existing network slice instance meets the requirement information.

13. The computer program product of claim 11, wherein the method further comprises configuring, in the management information, the first identifier, wherein the requirement information comprises a network slice coverage area, and wherein the network slice coverage area describes a coverage area in which the network slice instance is used.

14. The computer program product of claim 11, wherein the moving level is immobile.

15. The computer program product of claim 11, wherein the moving level is fast.

16. The computer program product of claim 11, wherein the moving level is medium-speed.

17. The computer program product of claim 11, wherein the moving level is slow.

18. The computer program product of claim 11, wherein obtaining the second identifier comprises:
  creating, based on the requirement information, the network slice instance; and
  allocating, to the network slice instance, the second identifier.

19. The computer program product of claim 11, wherein the method further comprises configuring, in the management information, the first identifier, and wherein the requirement information comprises a quantity of second users.

20. The computer program product of claim 11, wherein the method further comprises configuring, in the management information, the first identifier, and wherein the requirement information comprises a network latency.

21. An apparatus, comprising:
  a memory configured to store instructions; and
  one or more processors coupled to the memory and configured to execute the instructions to:
    send a network management request, wherein the network management request is a network allocation request, wherein the network management request comprises information about a network slice, wherein the information about the network slice comprises requirement information of the network slice and a first identifier for the requirement information of the network slice, and wherein the requirement information of the network slice comprises a moving level of a user;
    receive the network management request, wherein network management request comprises the information about the network slice;
    obtain, based on the requirement information, a second identifier of a network slice instance, wherein the network slice instance meets the requirement information; and
    configure, in management information of the network slice instance, the requirement information.

* * * * *